July 4, 1961 K. SPOHN 2,990,753
METHOD OF AND APPARATUS FOR MAKING PLATE-AND CYLINDER CAMS
Filed April 3, 1958 2 Sheets-Sheet 1

July 4, 1961     K. SPOHN     2,990,753
METHOD OF AND APPARATUS FOR MAKING PLATE-AND CYLINDER CAMS
Filed April 3, 1958     2 Sheets-Sheet 2

United States Patent Office 2,990,753
Patented July 4, 1961

2,990,753
METHOD OF AND APPARATUS FOR MAKING PLATE-AND CYLINDER CAMS
Karl Spohn, Damaschkestrasse 15, Esslingen-Oberesslingen, Neckar, Germany
Filed Apr. 3, 1958, Ser. No. 726,138
Claims priority, application Germany Apr. 4, 1957
10 Claims. (Cl. 90—20)

The present invention relates to the manufacture of radial cams from semi-finished blanks, and more particularly to the manufacture of plate-and cylinder cams.

In the manufacture of such cams, it is customary to mount the milling cutter in such manner that, in addition to a movement radially toward the axis of a semi-finished blank, the cutter performs a second, swinging, movement about a fixed axis. This swinging movement is in imitation of similar movement performed by the arm of a follower roller when the latter scans the periphery of a plate-or cylinder cam. While it is possible to contemplate such swinging movements of the follower's arm when the desired configuration of a radial cam is determined by calculation or experiment, the plotting of curves corresponding to the cam's desired contour is met with considerable difficulties because the sections of a so plotted curve are of different non-gradual inclinations. It is therefore preferred to compensate for the aberration resulting from swinging movements of the follower's arm by causing the milling cutter to perform a corresponding swinging movement during the finishing operation. A great disadvantage of such methods and apparatus is in that the driving mechanism must follow swinging movements of the cutter. A swingably mounted driving mechanism is rather costly and complicated since proper seating of the milling tool despite its complicated movements must be insured at all times.

An important object of the invention is to provide an improved method of manufacturing radial cams from semi-finished blanks according to which the cutter need perform no other but merely a rotary motion about a fixed axis.

Another object of the invention is to provide a method of manufacturing plate-and cylinder cams from semi-finished blanks according to which the blank performs a composite movement with respect to a milling cutter rotating about a fixed axis, the movements of the blank being so controlled that the periphery of cam manufactured therefrom obtains any desired configuration.

An additional object of the invention is to provide an apparatus for the practice of the improved method.

The above and other objects of the invention are attained by the provision of an apparatus consisting essentially of a carrier assembly which not only rotates a semi-finished blank but also itself performs a composite movement consisting of a linear motion and a superimposed linear motion at right angles to the first mentioned linear motion resulting in curvilinear displacements of the blank while the milling cutter rotates about a fixed axis. Thus, a cutter need not imitate the swinging movements of a follower's arm because the semi-finished blank itself performs corresponding movements with respect to the stationary milling tool. Hence, the movements of the cutting tool and of the blank are inverted which results in a considerable number of important advantages, particularly as regards the simplicity of construction of the improved apparatus. For example, the milling cutter may be mounted for rotation in stationary bearings and the driving mechanism for the cutter remains stationary, whereby the cutter's axis is positively prevented from becoming displaced during the milling operation.

According to one feature of my invention, the curvilinear movements of a blank are brought about in a very simple manner by the provision of a carrier assembly mounted for reciprocating movements in a linear path, and by further providing that a portion of the carrier assembly which rotatably supports a blank, for example, the upper part of the carrier assembly, simultaneously performs a second movement at right angles to the direction of movement of the entire carrier assembly, the secondary movement of the blank supporting part of the carrier assembly being controlled by a connecting means, for example, an adjustable lever, which is hinged, respectively, to the blank supporting part and to a stationary member of the apparatus. Swinging movements of the connecting means depend upon the desired contour of a plate-or cylinder cam to be manufactured from the blank placed onto the carrier assembly.

In its simplest form, the guide means for the relatively movable parts of the carrier assembly may comprise two pairs of parallel rods with one pair mounted in the stationary frame of my apparatus to control the linear movements of the entire carrier assembly, and the other pair of rods forming part of the carrier assembly and slidably mounting the blank supporting elements thereof.

The connecting means between the stationary frame and the blank supporting portion of the carrier assembly may be externally threaded and held to the frame by a nut or the like whereby the effective length of said connecting means and consequently the curvilinear path described by the blank with respect to a stationary milling cutter during reciprocating movements of the entire carrier assembly may be controlled within a desired range. Suitable scales may be provided to facilitate convenient and rapid determination of the effective length of said connecting means.

The drive mechanism for my improved apparatus not only must cause reciprocating movements of the entire carrier assembly to thereby cause curvilinear displacements of the blank mounted thereon, but the blank itself must be rotated by said drive mechanism. It is also desirable to so construct the drive mechanism as to be operable by a single element which may be connected to a power source, for example, an electric motor or the like, or may be driven by hand.

Moreover, provision should be made that the reciprocal movements of the entire carrier assembly can be controlled in dependency on the desired configuration of a cam to be manufactured from the blank supported by the carrier assembly. This may be achieved in a simple and efficient manner by the provision of an adjustable rocker arm directly reciprocable by the drive mechanism, and of an operative connection between the rocker arm and the carrier assembly.

The shaft which rotates the blank on the carrier assembly may be driven at a desired speed over a suitable worm gearing and reducing gearing directly by the shaft which also controls the reciprocating movements of the carrier assembly.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings, in which:

Figure 1:
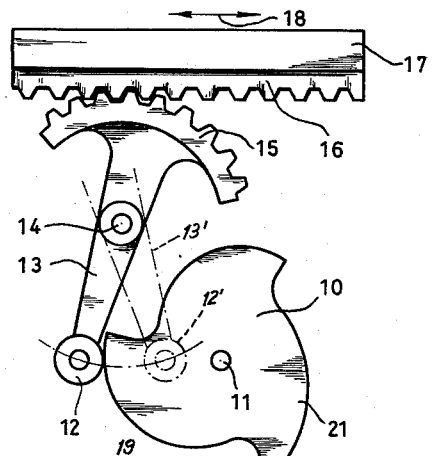
FIG. 1 illustrates a plate cam, fabricated from a blank in the apparatus of my invention, during actual use in a machine tool.

In FIG. 1, there is shown a plate cam 10 of the radial type which is assumed to be driven at a uniform speed in the direction of arrow 19 by a shaft 11. Follower roller 12 is mounted at one end of an arm 13 with the latter swingably supported by an axle 14 whereby the follower and the arm are free to oscillate between their full-line and dot-dash line positions 12, 13 and 12′, 13′, respectively, when the plate cam rotates. The other end of arm 13 is formed with a toothed segment 15 meshing with a toothed rack 16, the latter being rigidly fixed to the slide 17 of a machine tool or the like. As the roller 12 scans the periphery of driven cam 10, arm 13 causes reciprocating movements of slide 17 in the directions indicated by double arrow 18. The cam is so shaped that it causes gradual movements of slide 17 to right when the follower 12 scans the contours of arcuate cam sections 21, and rapid return of said slide to left when the follower is free to swing toward axle 11 along radial sections 23.

Figure 2:
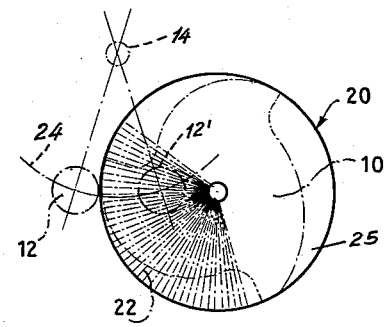
FIG. 2 shows a discoid blank of which the plate cam of FIG. 1 is made.
Figure 3:
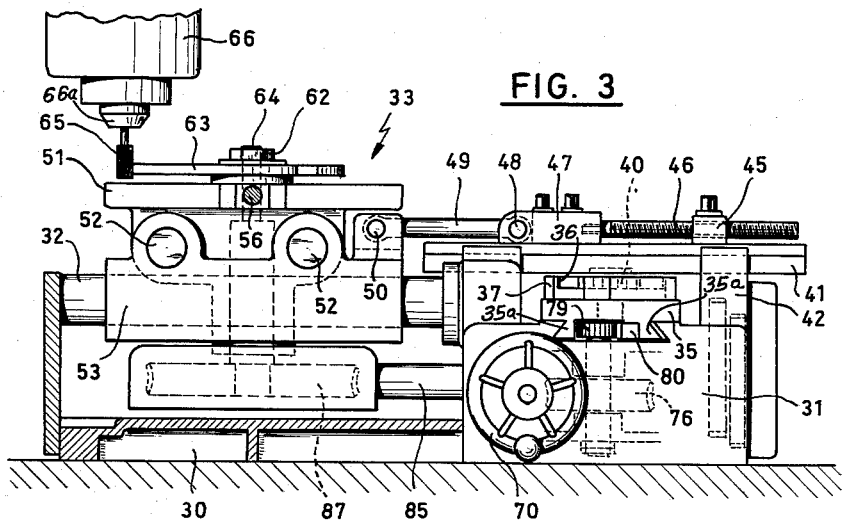
FIG. 3 is side elevational view in partial section of the improved apparatus for finishing plate-or cylinder cams, the section being taken on line III—III of FIG. 4.

FIG. 2 illustrates a blank 20 which is to be finished into the form of plate cam 10 by a milling tool 65 shown in FIG. 3. As above stated, the working surface of each cam section 21 and the sections 23 must be so shaped as to cause rhythmical reciprocating movements of slide 17. The curvature of section 21, for example, may be plotted on a series of radii 22 with equal center angles therebetween. The plotting of curve corresponding to the contour of cam section 21 is complicated by the fact that the follower's oscillation between its positions 12, 12′ occurs in an arcuate path indicated in dot-dash lines at 24. In other words, the curvature of section 21 must be corrected to insure gradual movements of follower 12 in the direction to left along its path 24. Such corrections are made by the apparatus to be described in greater detail in FIGS. 3 to 5. This apparatus removes from discoid member 20 three similar portions 25, it being understood, however, that the cam 10 has been illustrated merely by way of example and that the apparatus of my invention is capable of shaping any desired type of plate or cylinder cam.

Figure 4:
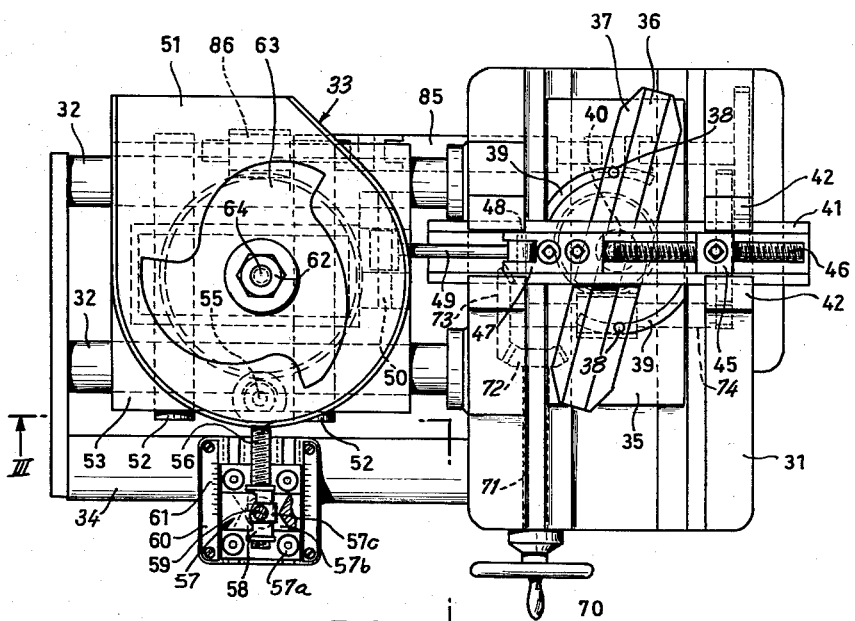
FIG. 4 is top plan view of the apparatus.

Referring now in greater detail to FIGS. 3 and 4, the apparatus therein shown comprises an understructure of frame 30 which includes a drive housing 31 and a pair of guide rods 32, the latter slidably supporting a carrier assembly identified by reference numeral 33. A sliding carriage 35 is mounted at the top of housing 31 for movements in directions transverse to those of carrier assembly 33. As best shown in FIG. 3, carriage 35 has a pair of dovetailed extensions 35a which fit into suitable recesses in the upper plate of housing 31, and also carries a rocker arm 37 provided with a channel 36. Member 37 has fixed thereto a pair of downwardly extendings pins 38 received in arcuate slots 39 provided in the carriage 35. Rocker arm 37 may be swung about a sliding block 40 into desired position with respect to carriage 35 and is then maintained in such position by a suitable locking mechanism (not shown). Sliding block 40 is connected with a top slide 41 which is mounted for reciprocating movements in directions parallel with members 32 and is guided in such movements by jaws 42 fixed to and projecting above the upper face of drive housing 31. Top slide 41 carries a bearing member 45 traversed by a screw jack 46 whose left-hand end is rotatably connected with a slider 47. Thus, when the member 46 is rotated in its bearing 45, slider 47 is displaced in the channel 41a of top slide 41.

One end of a transmission rod 49 is pivotally connected to slider 47 by a pin 48, the other end of member 49 being hinged to a carrier 53 forming the lower half of assembly 33. This lower carrier is slidably mounted on guide rods 32 and supports a second pair of guide rods 52 which latter are disposed at right angles to and above members 32. Guide rods 52 support a second carrier 51 forming the upper half of assembly 33 whereby the carrier 51 travels with but is capable of moving at right angles to the direction of movement of lower carrier 53. A lever 56 is rockably connected to carrier 51 by a vertical pin 55 for movements in a horizontal plane. In a recess 57b of an adjusting block 57 which is fixed in place by bolts 57a a rocking member 57c is arranged which may rock in a horizontal plane about an upper pin 59 and a lower pin (not shown), both pins being rotatably received in the adjusting block. The rocking member 57c has a central cylindrical passage through which the lever 56 passes. At both sides of the rocking member a nut 58 is threadedly arranged on the threaded lever 56, and after loosening the bolts 57a, the rocking member 57c and the nuts 58 it is possible to adjust the adjusting block 57 at its proper place which will be fixed by tightening nuts 58 and bolts 57a. The adjusting block 57 is movable in a channeled guide 60. Upper carrier 51 follows such movements of block 57 and may be further displaced along rods 52 by means of nut 58 when the block 57 is stationary. Upper faces of guide 60 are provided with scales 61 indicating to an operator the exact position of pivot pin 59 and block 57. At a certain position of threaded lever 56 with respect to nut 58, scales 61 indicate the effective length of said lever between pins 55 and 59. Guide 60 is fixed to a member 34 forming part of the understructure 30.

Carrier 51 supports an upwardly extending vertical shaft 64 for reception of a blank 63 which is fixed thereto by a nut 62. Blank 63 corresponds to discoid member 20 shown in FIG. 2. In FIG. 4 member 63 is shown after the cutter 65 has completed the milling operation, i.e. the blank has been given the shape of cam 10.

A milling cutter, e.g. an end mill 65, is received in chuck 66a disposed at the lower end of cylindrical casing 66 which may house an electric motor or the like (not shown) to drive the chuck 66a and cutter 65 at any desired speed. Casing 66 is stationary and may be rigidly fixed to, or form part of, the understructure 30.

Figure 5:
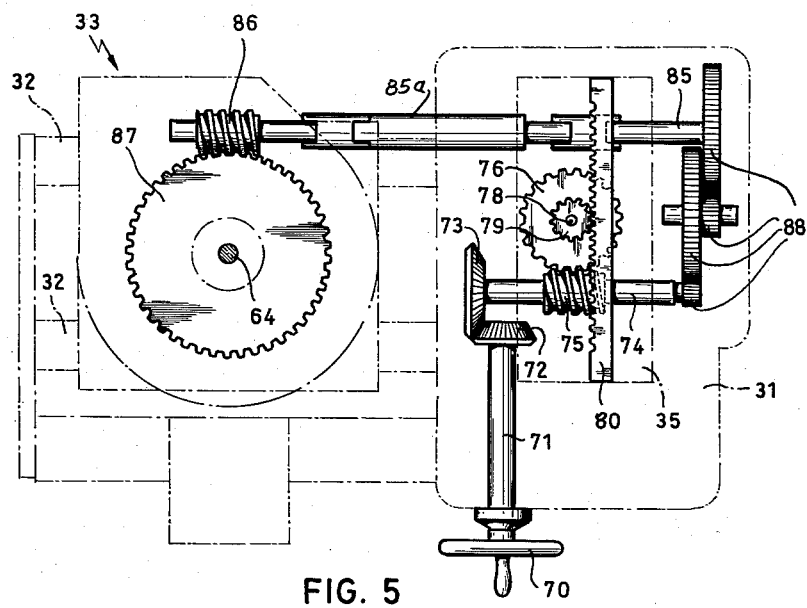
FIG. 5 illustrates the drive mechanism for the apparatus of FIGS. 3 and 4.

In the embodiment of FIGS. 3 to 5, the upper carrier 51 of my improved apparatus is set in motion by means of a driving mechanism best illustrated in FIG. 5. For the sake of clarity, the majority of parts described hereinbefore in connection with FIGS. 3 and 4 has been omitted from FIG. 5, and certain other parts which form no part of the driving mechanism, with the exception of shaft 64, are shown in dot-dash lines.

The driving mechanism is actuated by a hand wheel 70 which is fixed to one end of and rotates a shaft 71. The other end of said shaft carries a bevel gear 72 meshing with a second bevel gear 73, the latter being fixed to a worm shaft 74. A worm 75 on shaft 74 drives a worm wheel 76 keyed to a vertical axle 78. Pinion 79, also keyed to axle 78, meshes with a toothed rack 80 which is rigidly connected with the carriage 35. Thus, by rotating hand wheel 70, the operator causes reciprocating movements of carriage 35 along the upper face of drive housing 31. Top slide 41, urged by the block 40 which is received in the channel 36 of rocker arm 37, responds to movements of carriage 35 by reciprocating toward left and right (see FIGS. 3 and 4) between a pair of extreme positions determined by the inclination of channel 36 with respect to the direction of movement of carriage 35. Transmission rod 49 follows the movements of top slide 41, bearing member 45, jack 46 and slide 47, and thus entrains the entire carrier assembly 33 along guide rods 32.

During such reciprocating movements of the carrier assembly 33, top carrier 51 performs a second movement along guide rods 52 caused by lever 56 whose effective length, i.e. the distance between the axes of members 55 and 59, equals the axial distance between shaft 14 and follower 12 shown in FIG. 1. Accordingly, lever 56 performs swinging movements corresponding to those of arm 13, and the pin 55 oscillates in the same manner as follower roller 12.

During reciprocating movements of carrier assembly 33 and thus also of semi-finished blank 63, the latter should perform a corresponding angular movement which is brought about by driving its shaft 64. Worm shaft 74 drives a shaft 85 over a suitable gearing 88, the worm 86 adjacent to the left-hand end of member 85 meshing with worm wheel 87 which is fixed to the driving shaft 64. It will be noted that sections 85a of worm shaft 85 are of the Cardan shaft type. The Cardan shaft is of the telescope type so that its length may be extended or shortened in accordance with the motion of worm 86 and worm wheel 87 which aside from the rotational motion are stationary with respect to each other.

Hand wheel 71 may be replaced by another source of motive power, for example, an electric motor or the like.

In the following the production of a cam 10 of the configuration shown in FIG. 1 will shortly be described. First on a circular blank 20 or 63 the curves to be cut are marked, and in order to facilitate this marking radial lines are arranged on one front side of blank 20 or 63. In FIG. 2 a number of these radial lines are shown. Then on a suitable cutting means the portions 25 are roughly taken away and only then the arrangement according to the invention is used for accurately cutting the curvatures of sections 21.

It may be mentioned in this connection that it is also possible to precut the blank 20 or 63 or to finish sections 23 on the apparatus according to the invention and for achieving this the channel 36 is arranged at right angles to the guide rods 32. When the apparatus is arranged on an ordinary milling machine and the entire apparatus moved parallel to the guide rods 32 it is possible to precut sections 21 and 23 and to finish-cut section 23.

It will further be understood that certain elements described above, or two or more together, may also find a useful application in other types of apparatus differing from the types described above.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An apparatus for making radial cams from semi-finished blanks comprising, in combination, cutter means having an axis of rotation; means for rotating the cutter means about said axis; stationary guide means; carrier means including a first portion mounted for linear movements along said guide means at right angles to the axis of said cutter means, second guide means disposed at right angles to said first mentioned guide means, said second guide means being connected to and movable with said first portion, and a blank supporting second portion mounted for linear movements along said second guide means; means operatively connected with said second portion for rotating a blank supported thereon; means for moving the first portion along said first mentioned guide means; and connecting means articulately connected with said second portion and rotatable about a fixed axis for moving the second portion along said second guide means when the first portion is moved along said first mentioned guide means whereby to move selected peripheral zones of the blank into contact with said cutter means.

2. An apparatus for making radial cams from semi-finished blanks comprising, in combination, cutter means having a vertical axis of rotation; means for rotating the cutter means about said axis; stationary guide means disposed in a horizontal plane; carrier means including a first portion mounted for movements along said guide means, second guide means disposed in a horizontal plane above and at right angles to said first mentioned guide means, said second guide means being connected to and movable with said first portion, and a blank supporting second portion mounted for movements along said second guide means; means including a vertical shaft operatively connected with said second portion for rotating a blank supported thereon; means for moving the first portion along said first mentioned guide means; and connecting means articulately connected with said second portion and rotatable about a fixed vertical axis for moving the second portion along said second guide means when the first portion is moved along said first mentioned guide means whereby to move selected peripheral zones of the blank into contact with said cutter means.

3. An apparatus for making radial cams from semi-finished blanks comprising, in combination, a frame; stationary cutter means having an axis of rotation; means for rotating the cutter means about said axis; at least two guide rods mounted in said frame; carrier means including a first portion mounted for linear movements along said guide rods at right angles to the axis of said cutter means, second guide rods disposed at right angles to said first mentioned guide rods, said second guide rods being connected to and movable with said first portion, and a blank supporting second portion mounted for linear movements along said second guide rods; means operatively connected with said second portion for rotating a blank supported thereon; means for moving the first portion along said first mentioned guide rods; and connecting means articulately connected with said second portion and hinged to said frame for moving the second portion along said second guide rods when the first portion is moved along said first mentioned guide rods whereby to move selected peripheral zones of the blank into contact with said cutter means.

4. An apparatus for making radial cams from semi-finished blanks comprising, in combination, cutter means having an axis of rotation; means for rotating the cutter means about said axis; stationary guide means; carrier means including a first portion mounted for linear movements along said guide means at right angles to the axis of said cutter means, second guide means disposed at right angles to said first mentioned guide means, said second guide means being connected to and movable with said first portion, and a blank supporting second portion mounted for linear movements along said second guide means; means operatively connected with said second portion for rotating a blank supported thereon; means for moving the first portion along said first mentioned guide means; connecting means articulately connected with the second portion and swingable about a fixed axis for moving said second portion along said second guide means when said first portion is moved along said first mentioned guide means whereby to move selected peripheral portions of the blank into contact with said cutter means; and means for varying the length of said connecting means between the point of connection with said second portion and said fixed axis whereby to vary the extent of movement of the second portion along said second guide means.

5. An apparatus for making radial cams from semi-finished blanks comprising, in combination, cutter means having an axis of rotation; means for rotating the cutter means about said axis; at least two stationary parallel guide rods; carrier means including a first portion mounted for linear movements along said guide rods at right angles to the axis of said cutter means, second parallel guide rods disposed at right angles to said first mentioned guide rods, said second guide rods being connected to and movable with said first portion, and a blank supporting second portion mounted for linear movements along said second guide rods; means operatively connected with said second portion for rotating a blank supported thereon; means for moving the first portion along said first mentioned guide rods; connecting means articulately connected with said second portion and rotatable about a fixed axis for moving the second portion along said second guide rods when the first portion is moved along said first mentioned guide rods whereby to move selected peripheral zones of the blank into contact with said cutter means; and means for varying the length of said connecting means between the point of connection with said second portion and said fixed axis whereby to vary the extent of movement of said second portion along said second guide rods.

6. An apparatus for making radial cams from semi-finished blanks comprising, in combination, a frame; a milling cutter having a vertical axis of rotation; means for rotating the cutter; at least two horizontal parallel guide rods mounted in said frame; a carrier assembly including a lower portion mounted for reciprocating movements along said guide rods, at least two horizontal parallel guide rods disposed at right angles to said first mentioned guide rods, said last mentioned guide rods being connected to and movable with said upper portion along said first mentioned guide rods and a blank supporting upper portion mounted for reciprocating movements along said last mentioned guide rods; means operatively connected with said upper portion for rotating a blank supported thereon; means for reciprocating said upper portion along said first mentioned guide rods; a connecting lever articulately connected with said upper portion and adjustably hinged to said frame for swinging movements in a horizontal plane whereby to move said upper portion along said last mentioned guide rods when said lower portion is moved along said first mentioned guide rods and to move selected peripheral portions of the blank into contact with said cutter means.

7. An apparatus for making radial cams from semi-finished blanks comprising, in combination, cutter means having an axis of rotation; means for rotating the cutter means about said axis; stationary guide means; carrier means including a first portion mounted for linear movements along said guide means at right angles to the axis of said cutter means, second guide means disposed at right angles to said first mentioned guide means, said second guide means being connected to and movable with said first portion, and a blank supporting second portion mounted for linear movements along said second guide means; means operatively connected with said second portion for rotating a blank supported thereon; means operatively connected with said last mentioned means for moving the first portion between a pair of extreme positions along said first mentioned guide means; and connecting means articulately connected with said second portion and rotatable about a fixed axis for moving the second portion along said second guide means when the first portion is moved along said first mentioned guide means whereby to move selected peripheral zones of the blank into contact with said cutter means.

8. An apparatus for making radial cams from semi-finished blanks, comprising in combination, cutter means having an axis of rotation; means for rotating the cutter means about said axis; stationary guide means disposed in a plane substantially normal to said axis; a first carriage mounted for movement along said stationary guide means; second guide means disposed in a plane substantially parallel to said plane and located above and at right angles to said first mentioned guide means, said second guide means being connected to and movable with said first carriage; a second carriage mounted for movement along said second guide means; a supporting shaft turnably carried by said second carriage and having an axis substantially parallel to said axis of said cutter means, said supporting shaft adapted to support a blank for rotation therewith; rotating means for turning said shaft about its axis; moving means for moving said first carriage along said first mentioned guide means; means coupling said rotating means with said moving means so that the blank is rotated in timed sequence during movement of said first carriage; and elongated connecting means hinged at one end thereof to said second carriage and turnable about a fixed axis substantially parallel to said axis of said cutter means located adjacent the other end of said connecting means for moving said second carriage along said second guide means when said first carriage is moved along said first mentioned guide means.

9. An apparatus for making radial cams from semi-finished blanks, comprising, in combination, cutter means having an axis of rotation; means for rotating the cutter means about said axis; stationary guide means disposed in a plane substantially normal to said axis; a first carriage mounted for movement along said stationary guide means; second guide means disposed in a plane substantially parallel to said plane and located above and at right angles to said first mentioned guide means, said second guide means being connected to and movable with said first carriage; a second carriage mounted for movement along said second guide means; a supporting shaft turnably carried by said second carriage and having an axis substantially parallel to said axis of said cutter means, said supporting shaft adapted to support a blank for rotation therewith; a drive shaft; means operatively connected to said drive shaft and said first carriage for uniformly moving said first carriage along said first mentioned guide means during rotation of said drive shaft; means operatively connected to said drive shaft and to said supporting shaft for uniformly turning said supporting shaft during rotation of said drive shaft; and elongated connecting means hinged at one end thereof to said second carriage and turnable about a fixed axis substantially parallel to said axis of said cutter means located adjacent the other end of said connecting means for moving said second carriage along said second guide means when said first carriage is moved along said first mentioned guide means.

10. An apparatus for making radial cams from semi-finished blanks comprising, in combination, cutter means having a vertical axis of rotation; means for rotating the cutter means about said axis; stationary guide means disposed in a horizontal plane; carrier means including a first portion mounted for movement along said stationary guide means, second guide means disposed in a horizontal plane above and at right angles to said first mentioned guide means, said second guide means being connected to and movable with said first portion, and a blank supporting second portion mounted for movement along said second guide means; means including a vertical shaft operatively connected with said second portion for rotating a blank supported thereon; means for moving the first portion along said first mentioned guide means; a pivot pin mounted substantially parallel to said shaft and laterally spaced therefrom; and elongated connecting means articulately connected at one end thereof with said second portion and at the other end thereof to said pivot pin turnable about the axis thereof for moving said second portion along said second guide means when the first portion is moved along said first mentioned guide means thereby to move selected peripheral zones of the blank into contact with said cutter means.

References Cited in the file of this patent
UNITED STATES PATENTS

| 1,186,616 | Strecker | June 13, 1916 |
| 2,572,395 | Savage | Oct. 23, 1951 |
| 2,827,808 | Charlat | Mar. 25, 1958 |